(12) United States Patent
Remy et al.

(10) Patent No.: US 11,017,099 B2
(45) Date of Patent: May 25, 2021

(54) SYSTEMS AND METHODS FOR ENTROPY BALANCED POPULATION MEASUREMENT

(71) Applicant: Google LLC, Mountain View, CA (US)

(72) Inventors: Nicolas Remy, Mountain View, CA (US); Andrew Smith, Mountain View, CA (US); Ruixue Fan, Mountain View, CA (US); Joseph Kelly, Mountain View, CA (US); James Robert Koehler, Mountain View, CA (US); Xiaojing Wang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 84 days.

(21) Appl. No.: 16/341,827

(22) PCT Filed: Dec. 14, 2017

(86) PCT No.: PCT/US2017/066501
§ 371 (c)(1),
(2) Date: Apr. 12, 2019

(87) PCT Pub. No.: WO2018/169584
PCT Pub. Date: Sep. 20, 2018

(65) Prior Publication Data
US 2019/0236287 A1 Aug. 1, 2019

Related U.S. Application Data

(60) Provisional application No. 62/472,393, filed on Mar. 16, 2017.

(51) Int. Cl.
  G06F 21/60 (2013.01)
  G06Q 30/02 (2012.01)
  H04L 9/32 (2006.01)

(52) U.S. Cl.
  CPC ....... *G06F 21/602* (2013.01); *G06Q 30/0254* (2013.01); *H04L 9/3242* (2013.01)

(58) Field of Classification Search
  CPC .............. G06F 21/602; G06F 21/6218; G06F 21/6245–6263; G06Q 30/0254; H04L 9/3236–3242; H04L 63/0428
  See application file for complete search history.

(56) References Cited

U.S. PATENT DOCUMENTS

2011/0015989 A1* 1/2011 Tidwell .............. G06Q 30/0254
  705/14.43
2014/0281572 A1* 9/2014 Wang ................... G06F 21/6254
  713/189

(Continued)

OTHER PUBLICATIONS

International Preliminary Report on Patentability on Appln. Ser. No. PCT/US2017/066501 dated Sep. 26, 2019 (9 pages).

(Continued)

*Primary Examiner* — Kevin Bechtel
(74) *Attorney, Agent, or Firm* — Foley & Lardner LLP

(57) ABSTRACT

The present disclosure provides systems and methods for entropy balanced population measurement. Entropy balancing is a statistical technique for preprocessing data to achieve covariate balance. Weighting coefficients may be dynamically adjusted to satisfy balance conditions or constraints to adjust for inequalities in representation, thereby improving covariate moments. Using entropy balancing and linear regression analysis with panel content exposure and results data provides a mechanism to estimate the effects of multiple exposure vectors simultaneously, including instances where panelists are exposed to a vector multiple times. Data may be obfuscated or anonymized for preprocessing via a double-encrypted intersection-based extraction mechanism, allowing both measurement systems and panel providers to retain confidential information.

20 Claims, 4 Drawing Sheets

(56) References Cited

U.S. PATENT DOCUMENTS

2017/0132431 A1* 5/2017 Gonzalez Blanco ........................
G06F 21/6254
2018/0157703 A1* 6/2018 Wang .................. G06F 16/2453

OTHER PUBLICATIONS

International Search Report and Written Opinion for Appln. Ser. No. PCT/US2017/066501 dated Feb. 15, 2018 (14 pages).

* cited by examiner

SYSTEMS AND METHODS FOR ENTROPY BALANCED POPULATION MEASUREMENT

RELATED APPLICATIONS

The present application claims the benefit of and priority to U.S. Patent Application No. 62/472,393, entitled "Systems and Methods for Entropy Balanced Population Measurement," filed Mar. 16, 2017, the entirety of which is incorporated by reference herein.

BACKGROUND

Audiences for content blocks, such as broadcast media or online streamed media, including commercial advertising, are typically measured via single-source data panels consisting of individuals or households recording content exposure over time. Panels may be used to statistically estimate content exposure and results (e.g. purchases, initiating inquiries, etc.) for a larger population. However, where content exposure may be provided via multiple vectors or channels, it may be difficult to determine what portion of the results may be attributable to any exposure, while maintaining the confidential information and anonymity of the panel participants.

SUMMARY

Entropy balancing is a statistical technique for preprocessing data to achieve covariate balance. Weighting coefficients may be dynamically adjusted to satisfy balance conditions or constraints to adjust for inequalities in representation, thereby improving covariate moments. Using entropy balancing and linear regression analysis with panel content exposure and results data provides a mechanism to estimate the effects of multiple exposure vectors simultaneously, including instances where panelists are exposed to a vector multiple times. Data may be obfuscated or anonymized for preprocessing via a double-encrypted intersection-based extraction mechanism, allowing both measurement systems and panel providers to retain confidential information. While the present disclosure relates particularly to analysis of media consumption, it will be appreciated that this is only one example of domains to which the present techniques may be applied. For example, the techniques described herein may be used to analyze the efficacy of treatment vectors during clinical trials.

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Given a panel of audience members who have agreed to share their media consumption (e.g., by sharing TV shows watched, and allowing their online activity to be monitored) and product purchasing behavior, it may be difficult to determine how many purchases each item of media or content should receive "credit" for, which may be useful in determining return on investment for each channel or media source, or for comparison to a hypothetical absence of media.

Linear regression analysis may be used to determine, based on multiple variables, an estimated contribution of a variable to the particular outcome. However, given differences in exposure and representation, coefficient weights must be determined in order to properly perform the analysis. Preprocessing the data via entropy balancing allows covariate balancing. Weighting coefficients may be dynamically adjusted to satisfy balance conditions or constraints to adjust for inequalities in representation, thereby improving covariate moments. Using entropy balancing and linear regression analysis with panel content exposure and results data provides a mechanism to estimate the effects of multiple exposure vectors simultaneously, including instances where panelists are exposed to a vector multiple times. In particular, via the systems and methods discussed herein, the effect of multiple treatments or exposure variables may be determined simultaneously, providing an advantage over typical entropy balancing, which only allows estimation of a treatment effect with a single treatment and control group. The systems and methods discussed herein further allow estimation of a treatment effect when a user may have been exposed to the same treatment multiple times; and provide a mechanism to define user-level covariates based on previous treatment exposure and conversion behavior.

The data to be analyzed may, in many implementations, be obfuscated or anonymized for preprocessing via a double-encrypted intersection-based extraction mechanism, allowing both measurement systems and panel providers to retain confidential information. In one implementation that improves on the classic double locked box solution, panelist data from a panel provider and audience measurement data for a particular item of content from a content or search provider or measurement server may be hashed or encrypted via a hashing algorithm by one entity, and then rehashed by the other entity, via mutually agreed algorithms. Original data may not be decrypted by the opposing entity, but the resulting hash values may be compared and an intersection set of hash values may be extracted. The intersection set may thus represent panelists that have been exposed to particular items of content.

Figure 1:
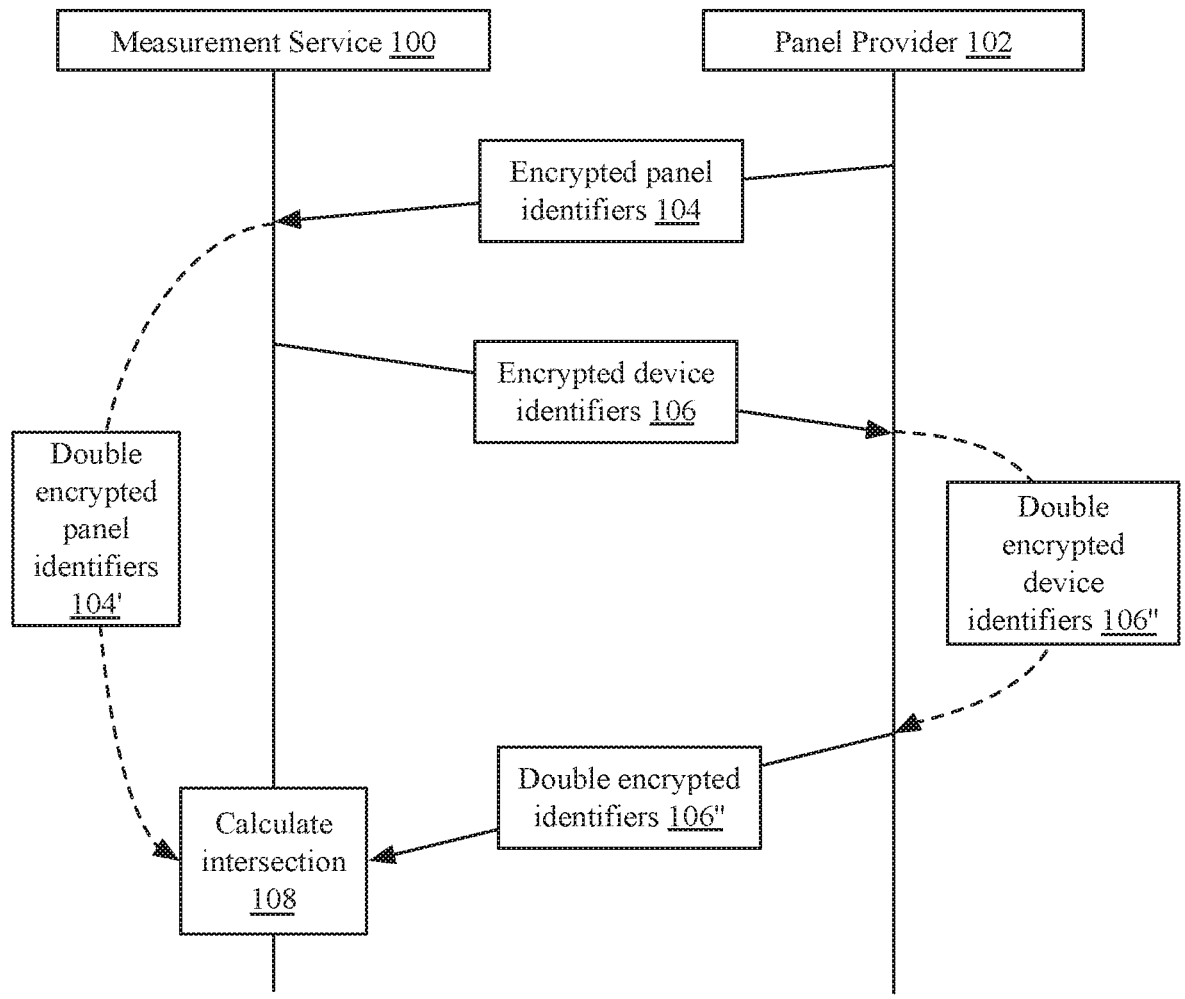
FIG. 1 is a signal flow diagram of an implementation of double-encrypted intersection-based data exchange and extraction.

Referring first to FIG. 1, illustrated is a signal flow diagram of an implementation of double-encrypted intersection-based data exchange and extraction. A measurement service 100 and panel provider 102, discussed in more detail below, may prepare data sets formatted according to mutually agreed-upon conventions. The data sets comprise one or more keys, each of which may comprise device identifiers, user names, account names, unique identifiers, network addresses, or any other such information. The keys may be processed with salt data for additional entropy, such as appended to or concatenated with a salt value, multiplied or XORed with the salt value, or otherwise manipulated according to the agreed-upon convention. Salt data may be shared by the entities or distinct or unique to each entity. The keys may then be encrypted and provided to a comparator device. In some implementations, the encryption may be of different types, while in other implementations, each device may perform the same encryption. For security purposes, in many implementations, the comparator device may be a dedicated computing device (not illustrated) that is used for no other purposes than performing the comparison, and may have its data irrecoverably deleted after processing. In other implementations, a device, such as the measurement service 100, may perform the comparison.

In one implementation, encrypted keys corresponding to panelist data 104 may be provided to a first device, such as a measurement service 100, and may be re-encrypted by the device to generate double-encrypted panelist data 104'. The device may not be able to decrypt the data to recover the original panel identifiers, in some implementations. The first device may also exchange encrypted audience data or content exposure data 106 corresponding to a particular item of content to a second device, such as panel provider 102. The second device may similarly re-encrypt the data to generate double-encrypted audience data 106'. The second device may not be able to decrypt the data to recover the original audience data, in some implementations, while in other implementations, it may be able to do so. The double-encrypted audience data may be transmitted back to the first device, which may determine an intersection set 108 of the double-encrypted panel data and double-encrypted audience data. The intersection set may comprise (encrypted) keys corresponding to panel members that were exposed to the particular item of content. The first device may utilize the intersection set to identify content exposure data logged by a measurement service corresponding to the panel members, in some implementations.

Figure 2A:
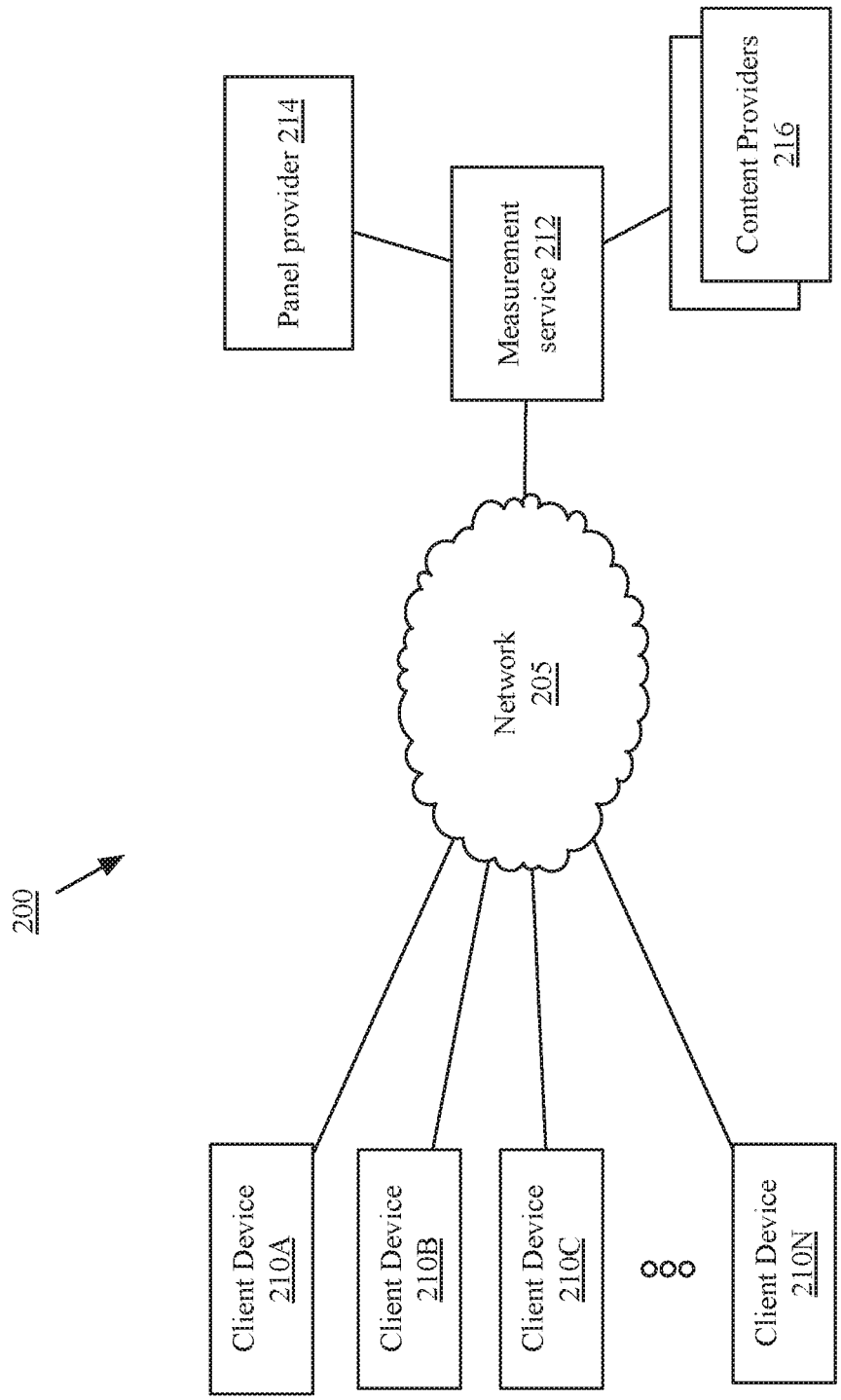
FIG. 2A is a block diagram of a content exposure measurement environment, according to one implementation.

Once the content exposure data has been securely identified and extracted from logs, the data may be pre-processed for linear regression analysis via entropy balancing, as discussed above. Prior to discussing specifics of the processing, it may be helpful to briefly describe the computing environment performing these functions. FIG. 2A is a block diagram of a content exposure measurement environment 200, according to one implementation. A network 205 may connect one or more client devices 210A-210N (referred to generally as client device(s) 210); and an audience measurement service 212 (sometimes referred to as a measurement server, measurement service, audience measurement device, content exposure measurement device, or by similar terms), panel provider 214, and one or more content providers. Client devices 210 may receive content from one or more content providers 214 via network 205, and measurement service 212 may log exposures of content. In some implementations as shown, content may be delivered from content providers via measurement service 212. In other implementations, content may be delivered directly to client devices 210, which may provide measurement data to measurement service 212 (e.g. redirect requests, representational state transfer (RESTful) pings or requests, status updates, log files, or any other type and form of notification of content exposure).

Still referring to FIG. 2A and in more detail, network 205 may be any form of computer network or combinations of networks that relay information between client devices 210 and one or more measurement services 212, content providers 216, and panel providers 214, as well as other devices not illustrated. Network 205 may include the Internet and/or other types of data networks, such as a local area network (LAN), a wide area network (WAN), a cellular network, satellite network, or other types of data networks. Network 205 may also include any number of computing devices (e.g., computer, servers, routers, network switches, etc.) that are configured to receive and/or transmit data within network 205. Network 205 may further include any number of hardwired and/or wireless connections. A client device 210 may communicate wirelessly (e.g., via WiFi, cellular, radio, etc.) with a transceiver that is hardwired (e.g., via a fiber optic cable, a CAT5 cable, etc.) to other computing devices in network 205. In some implementations, a network 205 may be a virtual network, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

Client device(s) 210 may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 205. In some implementations, a client device 210 may execute an application, service, server, daemon, routine, or other executable logic for communicating over a network 205, such as a web browser, mail client, video player, music player, video game, or any other such application. Such applications may include a command line interface, graphical user interface, or any combination of these or other interfaces. In implementations in which a client device is a smart television or set top box, the client device may receive content via a first interface, such as a terrestrial, satellite, or cable broadcast; and may communicate with an audience measurement server via a second interface via network 205, such as an Ethernet or WiFi interface. In other implementations, client device 210 may receive content via network 205 and may transmit identifications of interactions via network 205.

A content provider 216 may include one or more computing devices connected to network 205 and configured for providing content to a client 210, either directly or via an audience measurement service 212. A content provider 216 may be referred to variously as a content provider, server, web server, data server, publisher, service provider, or by other similar terms. In many implementations, content provider 216 may include a plurality of computing devices configured as a server farm or cloud, and may include routers, load balancers, network address translators, firewalls, or other such devices. Content providers 216 may be computer servers (e.g., FTP servers, file sharing servers, web servers, etc.) or combinations of servers (e.g., data centers, cloud computing platforms, etc.). Content providers 216 may provide any type and form of content, including text, images, video, audio, multimedia, or other data, or any combination of these. Content may include live media content, prerecorded media content, rendered content, movies, television shows, podcasts, video blogs, video games or other interactive content, advertising in any format, social media, or any other type and form of content.

Client devices 206 may transmit queries to an audience measurement service 212. Audience measurement service 212 may include one or more search servers, which may be configured in a server farm, cloud, or other network configuration. Measurement service 212 may receive search queries, redirect queries, measurement pings, log files, or other such data from client devices 206 and may save data identifying content that was provided to each client device for display or output. Measurement data may include alphanumeric strings or keywords, audio recordings, images, video recordings, or other such information. In many implementations, client devices 206 may transmit an identifier of the device to a measurement system 212 as part of a query or ping, or may include a cookie or other identifier received from the measurement system 212 in response to a prior query or ping or log in to a service provided by the measurement system 212 or an associated system, or otherwise obtained by the client device 206 to uniquely identify the client device 206 transmitting the measurement data and/or the user of the client device 206. Thus, although referred to generally as device identifiers or identifiers of the device, in many implementations, the identifiers may identify a user of the device rather than the device itself. Identifiers may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers, to identify the client device 206. In some implementations, the device identifier may be fixed to the device or preconfigured in the device, such as a manufacturer serial number or MAC address, while in other implementations, the device identifier may be dynamically set by the audience measurement server, or other entity, such as via a cookie or username. In some implementations, a unique or new device identifier may be set for each communication to the server, while in other implementations, the device identifier may not be changed, or may be changed periodically (e.g. hourly, daily, weekly, etc.) or at other intervals (e.g. on restart of the capture device, login to an internet service, etc.). A device identifier may be transmitted to the server before, with, or subsequent to a transmission of a query or measurement data. In one embodiment, a client device may log in or establish an authenticated session with a measurement service using the device identifier. In another embodiment, the client device may transmit a query or measurement data in the body of a packet, with the device identifier included in the header of the packet. Queries may be transmitted via a RESTful protocol, hypertext transfer protocol (HTTP) request (e.g. a POST or GET request with query data as a parameter-value pair), or via any other such application, session, or presentation layer protocol. In some implementations, requests or measurement data and device identifiers may be encrypted, hashed, or anonymized to protect privacy of individuals.

Panel provider 214 may comprise one or more computing devices, such as a server, server farm, cloud, or other network configuration of servers. Panel provider 214 may provide cookies or tokens or other authentication information to client devices 210 that are or correspond to users that are members of a pre-identified panel. The tokens or cookies may, in some implementations, be provided to measurement service 212. In other implementations, tokens or cookies may be retained by the client devices and panel provider to be used to tag corresponding records or logs.

Figure 2B:
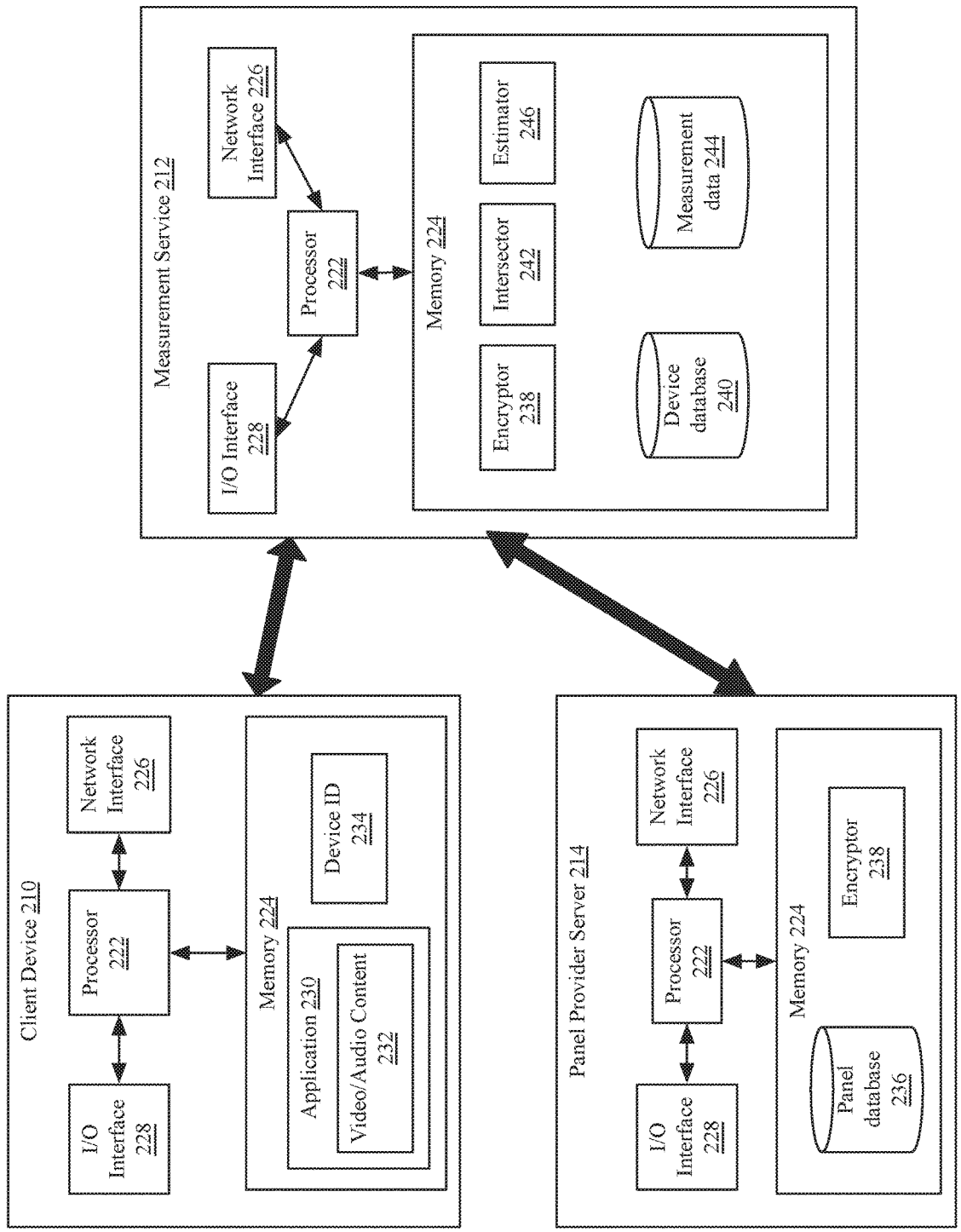
FIG. 2B is a block diagram of client and server devices shown in FIG. 2A, according to one implementation.

FIG. 2B is a block diagram of client and server devices shown in FIG. 2A, according to one implementation. Referring first to client device 210, a client device may be a computing device of a client or audience member of a live media stream. Client device 210 may be any number of different types of user electronic devices configured to communicate via network 205, including without limitation, a laptop computer, a desktop computer, a tablet computer, a smartphone, a digital video recorder, a set-top box for a television, a video game console, or any other type and form of computing device or combinations of devices. In some implementations, the type of client device 210 may be categorized as a mobile device, a desktop device or a device intended to remain stationary or configured to primarily access network 205 via a local area network, or another category of electronic devices such as a media consumption device.

In many implementations, client device 210 includes a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C#, Java, JavaScript, Perl, HTML, XML, Python and Visual Basic.

Client device 210 may include one or more network interfaces 226. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 205. In many implementations, client device 210 may include a plurality of network interfaces 226 of different types, allowing for connections to a variety of networks 205 or a network 205 such as the Internet via different sub-networks. Client device 210 may also include other interfaces for receiving terrestrial, satellite, or cable analog or digital broadcasts, as discussed above.

Client device 210 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 210, such as a built-in display, touch screen, microphone, etc., or external to the housing of client device 210, such as a monitor connected to client device 210, a speaker connected to client device 210, etc., according to various implementations.

Client device 210 may include in memory 224 an application 230 or may execute an application 230 with a processor 222. Application 230 may be an application, applet, script, service, daemon, routine, or other executable logic for receiving content 232 and displaying or otherwise outputting content via an output interface 228 of the client device (e.g. display, speaker, etc.). In one implementation, application 230 may be a web browser. Application 230 may include functionality for displaying content received via network interface 226 and/or generated locally by processor 222. In some implementations, application 230 may be a media player or include an embedded media player, such as a plug-in or native media player within a web browser. Application 230 may provide user interfaces for interacting with content played in the media player, such as a skip control, dislike button, or any similar interface.

Client 210 may include or be identified with a device identifier 234. Device identifier 234 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 234 may be fixed to the device or preconfigured in the device, such as a manufacturer serial number or MAC address, while in other implementations, the device identifier 234 may be dynamically set by a content provider, streaming server, application 230, or other entity, such as a cookie or username. In some implementations, a unique or new device identifier 234 may be set for each communication to a content provider and/or audience measurement server, while in other implementations, the device identifier 234 may not be changed, or may be changed periodically (e.g. hourly, daily, weekly, etc.) or at other intervals (e.g. on restart of the client device, login to an internet service, etc.). In some implementations, a device identifier 234 may be associated with one or more other device identifiers 234 (e.g., a device identifier for a mobile device, a device identifier for a home computer, etc.). In many implementations, as discussed above, a device identifier 234 may be generated and/or transmitted to the device 210 by a content provider. In other implementations, as discussed above, client 210 may request a device identifier or cookie 234 from a measurement service or content provider, and may transmit the device identifier or cookie 234 to the measurement service or content provider in association with requests for content or measurement data.

Also illustrated in FIG. 2B is a block diagram of an implementation of a panel provider server 214. As with client devices 210, server 214 may include one or more processors 222, memories 224, network interfaces 226, and user interfaces 228. In some implementations referred to as headless servers, a server 214 may not include a user interface 228, but may communicate with clients 210 with user interfaces 228 via a network 205. Memory 224 may include content storage, such as storage of webpages, images, audio files, video files, data files, or any other type and form of data. In some implementations, memory 224 may store one or more applications (not illustrated) for execution by processor 222 of the server, including FTP servers, web servers, mail servers, file sharing servers, peer to peer servers, or other such applications for delivering content stored in content storage. Panel provider server 214 may store in memory 224 a panel database 236, which may comprise a flat file, data array, relational database, or any other type and form of data file, and may include keys or records corresponding to panel members. Such keys or records may comprise device identifiers, user names, or other information about the user and/or device, and may, in many implementations, be anonymized or encrypted to protect privacy. In many implementations, panel provider server 214 may also comprise an encryptor 238. Encryptor 238 may comprise a hardware or software module for encrypting data, such as panel keys or records stored in database 236. In some implementations, encryptor may be a dedicated hardware encryption module performing a strong encryption algorithm, such as an RSA or SHA algorithm or similar encryption or hash function. In other implementations, encryptor 238 may be executed by processor 222 and may comprise a software application, service, server, daemon, routine, or other executable logic. As discussed above, encryptor 238 may append or otherwise add salt data to panel data for additional entropy. Encrypted data may be shared with a measurement device or comparison device, as discussed above.

Also illustrated in FIG. 2B is a block diagram of an implementation of a device or server of a measurement service 212. As with client devices 210, measurement service 212 may include one or more processors 222, memories or storage devices 224, network interfaces 226, and user interfaces 228. In some implementations referred to as headless servers, a server 212 may not include a user interface 228, but may communicate with clients 210 or panel providers with user interfaces 228 via a network 205. In some implementations, memory 224 may store one or more applications for execution by processor 222 of the server, including FTP servers, web servers, mail servers, file sharing servers, peer to peer servers, or other such applications for delivering content or redirection commands to allow clients to access content at a content provider.

Server 212 may execute an encryptor 238 as discussed above in connection with panel provider server 214, for encrypting device data, measurement data, content logs, or other such information, as discussed above. As discussed above, encryptor 238 may perform any type and form of encryption of hashing function on device data. In many implementations, device data in database 240 may comprise similar identifiers and/or be formatted similarly to data in panel database 236, including device identifiers 234, user names, user accounts, unique identifiers, or other such data. As discussed above, the identifiers may be encrypted for privacy and compared with similarly encrypted identifiers from the panel provider to identify an intersection set, without requiring decryption of the identifiers.

Measurement service 212 may comprise or execute an intersector 240. In some implementations, intersector 240 may comprise a hardware circuit for determining an intersection of two input signals or bit streams representing double encrypted datasets from the measurement service and panel provider, such as an XOR gate. In other implementations, intersector 240 may comprise a software application, service, server, daemon, routine, or other executable logic for calculating an intersection of two data sets, such as via a sorting and matching function, an XOR comparison, or any other such logic.

Measurement service 212 may comprise an estimator 246. Estimator 246 may comprise a software application, service, server, daemon, routine, or other executable logic for calculating entropy balanced coefficient weights for covariate analysis pre-processing, and for performing a simple linear regression on a selected covariate to determine an estimated contribution to a given result. Software based implementations of the estimator 246 may be in any suitable programming language, such as the R or Stata statistical programming languages, or any other suitable language. In some implementations, estimator 246 may process measurement data 244 stored in a measurement database. Measurement data 244 may comprise logs or stored data indicating each instance of content exposure for a particular client device 210, and may include content identifiers, device identifiers, timestamps, content sources or channels, genres, types, metadata, or any other such information about content and/or devices. In some embodiments, estimator 246 may process the data in a three step process: first, for each channel for which an estimate of a causal impact is desired, the estimator may create a regression model data set consisting of pre-treatment covariates (e.g., demographics), content exposure history, treatment variable for the content type of interest, and a response based on conversion behavior; second, the estimator may perform an entropy balancing process on this regression data set, which creates observation-level weights for the control group such that the covariates have the same weighted means and variances between treatment and control; third, the estimator may estimate the causal effect of the channel using weighted simple linear regression of the response on the treatment variable, with the weights calculated in step two. In some embodiments, this modeling process may be carried out separately per media channel.

In some implementations, the modeling data sets may comprise:

Covariates: All previous content exposure and previous conversion activity may be treated as covariates. Given the large number of weeks of data in measurement data sets, the estimator or measurement service may aggregate previous activities so that the dimensionality of the covariate set may be manageable, in some implementations. In one such implementation, three and six week time windows may be used, although shorter and longer windows may be utilized in other implementations. The estimator may calculate aggregate history variables for each panelist/time period (e.g. day, week, etc.) combination. Exposure to other channels in the current week may be treated as additional covariates.

Response: Response data may include aggregated conversions in both the current week as well as future weeks (or other such time periods as discussed above). The aggregation period may be identical to the time periods noted above (e.g. such as three or six weeks) or different (e.g. four or eight weeks).

Time periods: Time periods for each exposure set may be different, and may not be required to start and end together. In one such embodiment, a first subset of the data may comprise content exposures and conversions for a first set of weeks (e.g. weeks 39-43) and a second subset of the data may comprise content exposures and conversions for a second set of weeks (e.g. weeks 45-49). However, content exposure history variables and future conversion behavior may be calculated without regard to these restrictions and not dependent on the specific weeks for the data set (e.g. an observation in first data set for week 42 may be used to measure conversion behavior for weeks 42-46, even though the campaign may have ended in week 43).

In many implementations, covariates may need to be balanced to address differences in representation and distribution. Specifically, entropy balancing may control for previous conversion and content exposure for each panelist by weighting observations in the treatment and control groups in such a way that all covariates have similar distributions (same mean and variance) in both the treatment and control groups. This alleviates confounding effects from the covariates. Using the weights, the regression coefficient of the treatment indicator is now a more reliable estimate of the treatment's causal effect.

In some implementations, the estimator may select or determine an order of moments to match between the treatment and control groups. In one implementation, the balancing will match the means of all covariates only. However, in other implementations, the balancing may also match higher-order moments by including corresponding new columns in the covariate matrix (e.g., to match the mean and variance of $X_1$, include $X_1$ and $X_1\hat{}2$ in the matrix of covariates). In many implementations, matching the first two moments may provide sufficient balancing, such that the treatment and control groups have identical means and variances for each covariate.

In some implementations, balancing may be accelerated by standardizing or normalizing each covariate have 0 mean and unit variance before performing balancing calculations. This standardization does not affect the outcome of the regression model since only the weights, and not the original covariate values, appear in the regression.

Once weights have been derived via entropy balancing, the estimator may perform a simple linear regression to identify the contribution of a covariate:

lm(response~treatment,
    weights=entropy.balancing.weights)

Here the regression is linear, rather than logistic as in some implementations, for two reasons: first, the response is not binary, but rather a count of future conversion events (this may be useful in cases when the purchase cycle is short and an individual panelist could convert many times during the campaign); and second, implementing continuous weights may be difficult to program in some languages in which weight arguments require or expect counts of cases.

To estimate the total conversions attributed to each channel, the estimator may multiply the coefficient in the corresponding regression model by the total number of impressions for that channel.

Figure 3:
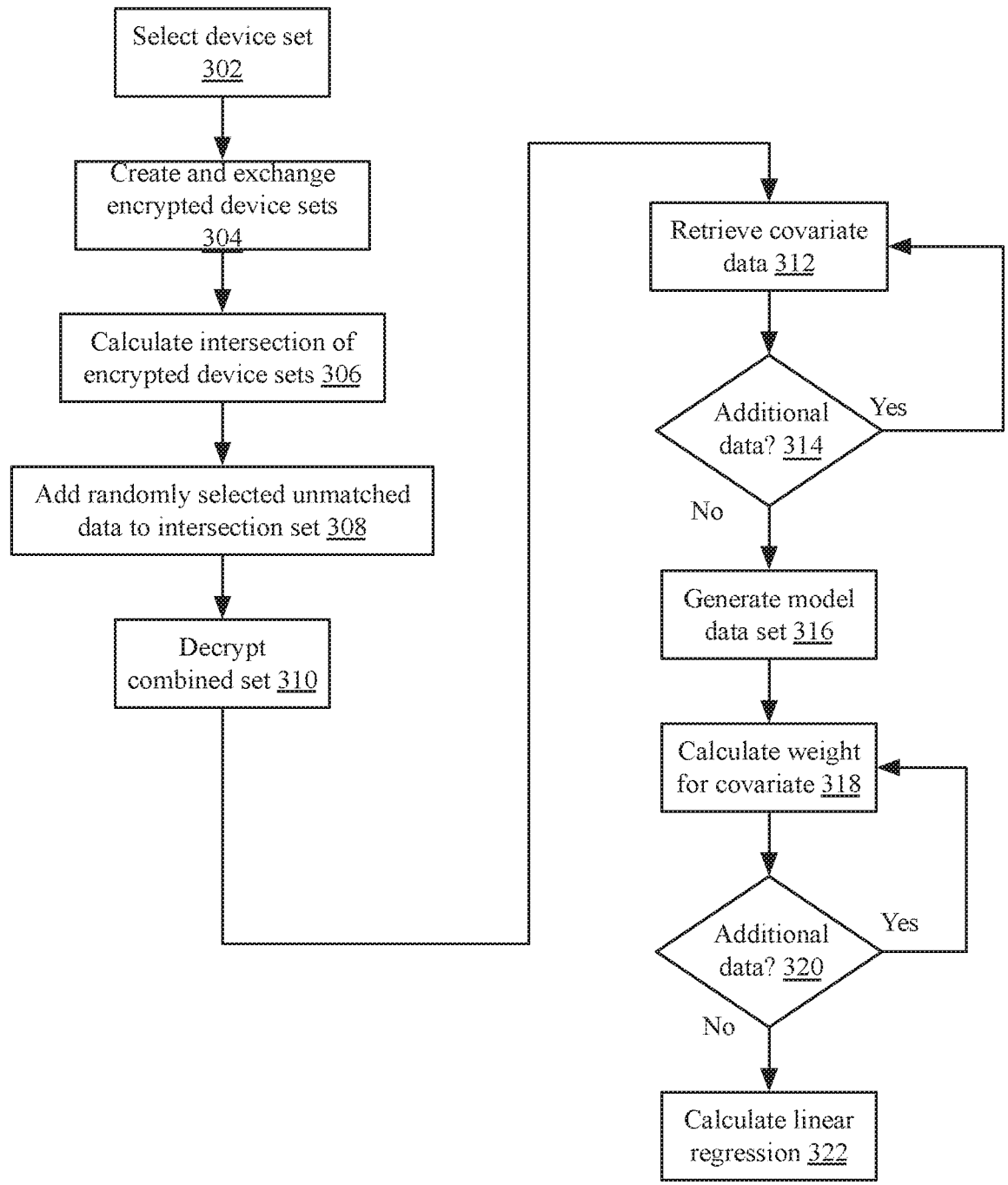
FIG. 3 is a flow chart of a method for entropy balancing and linear regression analysis with panel content exposure and results data, according to one implementation.

FIG. 3 is a flowchart of a method for entropy balancing and linear regression analysis with panel content exposure and results data, according to one implementation. At step 302, a first device, such as a panel provider server or a measurement server, may select a device set or panelist set. The set of devices or panelists may be selected for any reason, such as demographic or geographic similarities, types of devices, broadcast recipients, or any other such criteria. At step 304, the first device may create an encrypted data set comprising encrypted keys for each member of the device or panelist set. The keys may be formatted according to a predetermined and mutually agreed-upon specification, and may include device identifiers, user names, account names, network addresses, or any other such information. The keys may be encrypted or a hash calculated for each key, and in many implementations, prior to encryption, salt (e.g. a predetermined data string) may be concatenated with, appended to, or otherwise added to each key for additional entropy. The encryption system may comprise any type and form of encryption, and may be performed by hardware or software encryption modules, as discussed above. Furthermore, as discussed above, in many implementations, a second device (e.g. the other of the panel provider server or measurement server) may similarly select and generate an encrypted set of keys for devices or panelists. Additionally, in some implementations, upon receipt of an encrypted data set, the device may perform an additional iteration of encryption or calculate a hash result from the encrypted dataset, creating a doubly-encrypted data set. The device may similarly double-encrypt its own data set (i.e. the data set generated at step 304).

At step 306, a device (e.g. the first device or second device) may calculate an intersection of the encrypted or doubly-encrypted data sets. As discussed above, in some implementations, the double encryption may be used to ensure that the device cannot decrypt the data set and discover personal information regarding a user of a computing device or a panelist member, but may nonetheless be used to uniquely and anonymously identify a device. The intersection set may correspond to identifiers of devices of panelists that received and presented specific content items or channels or sources of content, as discussed above.

At step 308, in some implementations, additional unmatched data or null data may be added to the derived intersection set. The unmatched data may comprise randomly selected data, device identifiers, or other such information, similarly encrypted or double encrypted, and not corresponding to a panelist or device that displayed the specific content or channels. In one such implementation, 1, 10, 100, or any other number of additional "null" data records may be added to the intersection set to obfuscate the intersected device identifiers. At step 310, in some implementations, the resulting data set may be provided to an estimator or measurement service, which may decrypt the data set to obtain keys corresponding to devices of panelists that displayed or output the specific content, and additional null or invalid data, further anonymizing or obfuscating data that corresponds to individuals.

At step 312, an estimator, such as an estimator executed by a measurement service as discussed above, may retrieve covariate data corresponding to the decrypted keys of the combined set. The covariate data may comprise any type and form of variables, including demographics, content exposure, channels, times of day (e.g. minutes or hours), time windows (e.g. periods of days or weeks), or any other such information. The data may be retrieved from measurement logs, device databases, and/or panelist databases according to device identifiers or other unique identifiers of the keys. In some implementations, all of the covariate data for a single variable may be retrieved, before determining whether there is additional data to be retrieved at step 314 and iteratively repeating steps 312 and 314. In other implementations, all of the potential data may be retrieved in a single step at step 312 and step 314 may be skipped.

At step 316, the estimator may generate a model data set as discussed above. Generating the model data set may comprise normalizing or standardizing the data as discussed above, including centering a mean at 0 and/or identifying a unit variance. At step 318, the estimator may calculate a weight or coefficient for a covariant using an entropy balancing mechanism, such as the ebal routine for the Stata and R programming languages, or any other type and form of executable logic for performing entropy balancing. The various weights may be calculated for each covariant—i.e. at step 320, if additional covariants are determined to exist, then steps 318-320 may be repeated iteratively.

Once rebalanced, at step 322, a simple linear regression may be calculated on a variable of interest. Specifically, a variable may be identified (e.g. specific content, content type, distribution channel, etc.), and, with the balanced weights, a regression may be calculated to estimate the contribution provided by the variable to the results of a binary outcome. In some implementations, step 322 may be iteratively repeated for a plurality of variables, allowing quick analysis of each potential difference in content exposure or demographic data and estimation of its contribution to the result. As a result of this data, content distribution systems may be adjusted to achieve optimum effect at a minimum of distribution, in accordance with the estimations of value. For example, one or more content distribution schedules may be generated based upon the estimations of value. A content distribution system may be caused to distribute content in accordance with the one or more content distribution schedules. It will be appreciated that where the techniques described herein are used to analyze data from other domains (such as clinical trials), other schedules may be generated in accordance with a desired outcome for those domains (such as a treatment schedule, a distribution schedule, etc.).

Thus, the systems and methods discussed herein provide for enhanced accuracy of estimations of effectiveness of different content and/or distribution systems. Content providers may reduce delivery of ineffective content or adjust distribution systems or parameters to direct content to other users who may be more receptive; similarly, content providers may increase delivery of effective content and/or adjust distribution from non-receptive users, reducing network bandwidth, server and client processing time, and memory requirements.

In many implementations, demographic information about users utilized for alternate content selection may be anonymized or disambiguated to protect the privacy of the device user. In many such implementations or similar situations in which personal information about the user of a client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). In some implementations, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the measurement server, panel provider server, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method for measurement data estimation via secure exchange, comprising:
    selecting, by a measurement service, a first subset of device identifiers corresponding to a first subset of a population of devices;
    generating, by an encryptor of the measurement service, a first encrypted data set comprising an encrypted key for each device identifier of the first subset of device identifiers by encrypting each of the first subset of device identifiers using a first encryption technique;
    receiving, by the measurement service from a second device, a second encrypted data set comprising second encrypted keys generated by encrypting a second subset of device identifiers using the first encryption technique, the second subset of device identifiers corresponding to a second subset of the population of devices;
    generating, by an intersector of the measurement service, an intersection set from the first encrypted data set and the second encrypted data set, the intersection set including matching encrypted keys present in both the first encrypted data set and the second encrypted data set;
    adding, by the measurement service, randomly selected additional data encrypted using the first encryption technique to the intersection set to generate a combined data set; and
    providing, by the encryptor, the combined data set to an estimator device, causing the estimator device to decrypt the combined data set to generate a plurality of obfuscated data entries comprising an entry for each device identifier of the second subset of device identifiers and for each entry of the randomly selected additional data.

2. The method of claim 1, further comprising re-encrypting, by the encryptor, the received second encrypted data set.

3. The method of claim 2, further comprising re-encrypting, by the encryptor, the first encrypted data set.

4. The method of claim 1, wherein generating the first encrypted data set further comprises calculating a hash, by the encryptor, of each device identifier of the first subset of device identifiers.

5. The method of claim 4, wherein generating the first encrypted data set further comprises adding a predetermined data string to each device identifier of the first subset of device identifiers before calculating the hash of each device identifier of the first subset of device identifiers.

6. The method of claim 1, wherein selecting the first subset of device identifiers is responsive to each device in the first subset of the population of devices having received a predetermined item of content.

7. The method of claim 1, wherein providing the combined data set to the estimator device further causes the estimator device to retrieve covariate data corresponding to each entry of the plurality of obfuscated data entries.

8. The method of claim 7, wherein providing the combined data set to the estimator device further causes the estimator device to generate a model data set according to the retrieved covariate data.

9. The method of claim 8, wherein providing the combined data set to the estimator device further causes the estimator device to calculate an entropy balanced weight for each entry in the covariate data.

10. The method of claim 9, wherein providing the combined data set to the estimator device further causes the estimator device to:
    select a first characteristic of the population of devices; and
    calculate a linear regression according to the entropy balanced weight for each entry in the covariate data to generate a distribution of the first characteristic within the population of devices.

11. A system for measurement data estimation via secure exchange, comprising:
    a computing device comprising a processor executing an encryptor and an intersector, and a network interface in communication with a second computing device;
    wherein the encryptor is configured to:
        select a first subset of device identifiers corresponding to a first subset of a population of devices, and generate a first encrypted data set comprising an encrypted key for each device identifier of the first subset of device identifiers by encrypting each of the first subset of device identifiers using a first encryption technique;

wherein the network interface is configured to receive, from the second computing device, a second encrypted data set comprising second encrypted keys generated by encrypting a second subset of device identifiers using the first encryption technique, the second subset of device identifiers corresponding to a second subset of the population of devices;

wherein the intersector is configured to generate an intersection set from the first encrypted data set and the second encrypted data set, the intersection set including matching encrypted keys present in both the first encrypted data set and the second encrypted data set; and wherein the encryptor is further configured to:
add randomly selected additional data encrypted using the first encryption technique to the intersection set to generate a combined data set, and
provide the combined data set to an estimator device, causing the estimator device to decrypt the generate a plurality of obfuscated data entries comprising an entry for each device identifier of the second subset of device identifiers and for each entry of the randomly selected additional data.

12. The system of claim 11, wherein the encryptor is further configured to re-encrypt the received second encrypted data set.

13. The system of claim 12, wherein the encryptor is further configured to re-encrypt the first encrypted data set.

14. The system of claim 11, wherein the encryptor is further configured to calculate a hash of each device identifier of the first subset of device identifiers.

15. The system of claim 14, wherein the encryptor is further configured to add a predetermined data string to each device identifier of the first subset of device identifiers before calculating the hash of each device identifier of the first subset of device identifiers.

16. The system of claim 11, wherein the encryptor is further configured to select the first subset of device identifiers responsive to each device in the first subset of the population of devices having received a predetermined item of content.

17. The system of claim 11, wherein providing the combined data set further causes the estimator device to retrieve covariate data corresponding to each entry of the plurality of obfuscated data entries.

18. The system of claim 17, wherein providing the combined data set further causes the estimator device to generate a model data set according to the retrieved covariate data.

19. The system of claim 18, wherein providing the combined data set further causes the estimator device to calculate an entropy balanced weight for each entry in the covariate data.

20. The system of claim 19, wherein providing the combined data set further causes the estimator device to:
select a first characteristic of the population of devices; and
calculate a linear regression according to the entropy balanced weight for each entry in the covariate data to generate a distribution of the first characteristic within the population of devices.

* * * * *